United States Patent Office 2,769,347
Patented Nov. 6, 1956

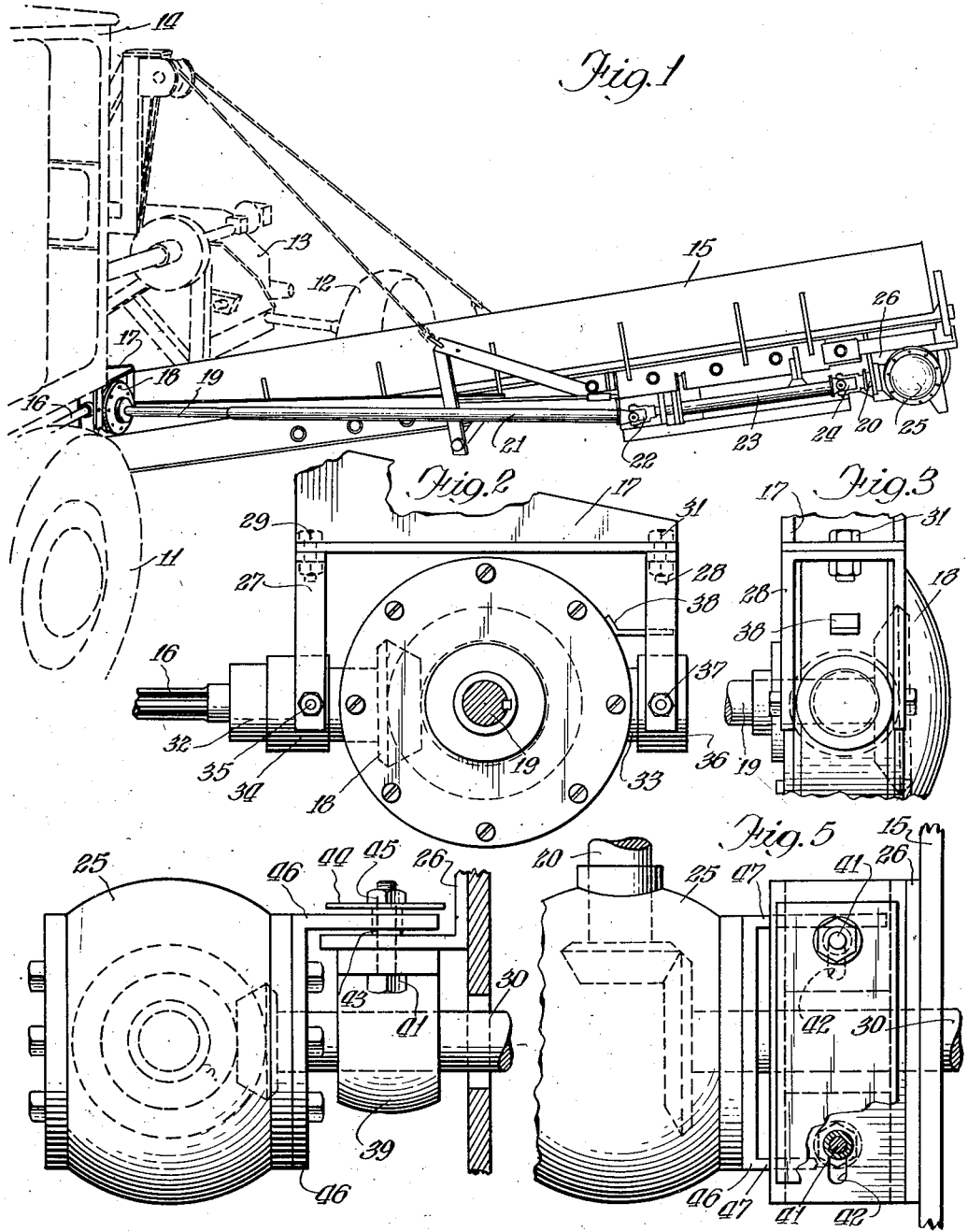

2,769,347

TRANSMISSION GEAR UNIT MOUNTING

Raymond M. Ulrich, Roanoke, Ill., assignor to Ulrich Foundation, Inc., a corporation of Delaware Original application May 17, 1951, Serial No. 226,839. Divided and this application August 18, 1955, Serial No. 529,276

3 Claims. (Cl. 74—385)

The present invention relates to a transmission gear unit mounting providing certain degrees of freedom of motion of the housing of the unit.

This is a division of my copending patent application Serial No. 226,839, filed May 17, 1951, for a Transmission Gear Unit Mounting.

During recent years there has been developed an elevating attachment for motor graders. This attachment consists of a plow and an elevating conveyor carried transversely of the motor grader. The motor grader has an elongated frame which extends forwardly of the cab and driver's position. The elevating attachment is located between the cab and the front wheels. In back of the cab is located the power unit and several sets of driving wheels. A power take-off is provided for the motor, which is at the rear of the grader. Power is supplied from the take-off to a shaft extending lengthwise of the frame of the motor grader to a point in the proximity of the front portion of the cab. Here a transmission gear unit is connected to the shaft and another shaft extends at right angles thereto. This shaft is preferably a portion of a telescopic driving shaft arrangement terminating in a universal joint, which in turn is connected to another transmission gear unit which drives the drum upon which is mounted the endless belt of the conveyor.

In operation the conveyor portion of the attachment may be arranged at various angles dependent upon the conditions of operation and the type of work being done. Thus the shaft extending from the gear transmission unit adjacent the cab of the grader may assume one of a number of positions so that the shaft in effect is moved through an appreciable angle in a vertical plane.

It has been found under such conditions of operation that it is difficult to properly align the gear transmission unit when making the installation, and even when it is properly aligned, the units are subject to certain shock and wear which could be minimized or eliminated by a unique mounting arrangement. It has been found that by providing a mounting arrangement which permits the housing of the gear transmission unit to oscillate or move through a certain angle, much shock and wear is minimized; and compared to the conventional construction, one of the universal joints heretofore made has been eliminated.

It therefore is an object of the present invention to provide a mounting for a gear transmission unit which will eliminate the need for a universal joint.

Another object of the present invention is to provide a gear transmission unit mounting which will minimize the wear on the bearings of the unit.

A further object of the invention is to provide a mounting for a gear transmission unit which will facilitate the alignment of the unit without shafts interconnected thereby.

A further object of the present invention is to provide an improved gear transmission unit arrangement which will facilitate alignment of one of the shafts connected thereto.

A still further object of the present invention is to provide a transmission unit mounting which will minimize the shock and wear otherwise transmitted to the unit.

Still another object is to provide an improved mounting for a transmission gear unit which will facilitate the adjustment of the position of an element driven by said unit.

Other and further objects of the present invention subsequently will become apparent by reference to the following description taken in conjunction with the accompanying drawings, wherein:

Figure 1 is a perspective view showing a portion of a typical apparatus to which the present invention has been applied;

Figure 2 is a front view of one embodiment of the present invention;

Figure 3 is an end view of the embodiment shown in Figure 2;

Figure 4 is an end view of another embodiment of the present invention; and

Figure 5 is a plan view of the embodiment shown in Figure 4.

In Figure 1 there is shown a portion of a motor grader which has rear driving wheels 11 and front steering wheels 12 carried by a frame 13, which at an intermediate point carries a driver's cab 14. Arranged transversely of the frame 13 between the cab 14 and the front wheels 12 is an elevating attachment, a portion of which 15 is visible in Figure 1. This portion consists primarily of an endless belt conveyor.

The driving motor for the motor grader is located to the rear of the cab 14 and is provided with a power take-off unit connected to a shaft 16 arranged generally parallel to the rear portion of the frame 13. At a point just ahead of the cab 14 there is located a mounting bracket 17 which carries certain elements supporting a gear transmission unit 18. The unit 18 interconnects the shaft 16 with another shaft 19 arranged at right angles thereto. The shaft 19 is a portion of a drive shaft which includes a telescopic shaft portion 21 terminating in a universal joint 22. The universal joint 22 is connected to a shaft 23 terminating in another universal joint 24, which is connected to the stub shaft of a transmission gear unit 25 supported from a bracket 26 at the outer end of the conveyor frame 15. The particular conveyor frame shown is one which may be shortened by taking out a portion of a frame and removing a portion of the conveyor belt. When this is done the shaft 23 and the universal joint 24 also are removed so that the universal joint 22 is connected directly to the stub shaft of the transmission gear unit 25.

The transmission gear unit 25 connects to a shaft which drives a drum for supplying motive power to the endless belt of the elevating conveyor 15. This drum must be arranged to be adjustable within certain limits so that proper tension may be applied to the belt. The drum furthermore must also be adjustable so as to produce smooth operation of the endless belt without causing it to bear heavily against one side or the other of the frame of the elevating attachment 15.

In prior embodiments the shaft 19 had been provided with the universal joint which was connected to the stub shaft of the transmission gear unit 18. It has been found difficult to properly position the gear transmission unit 18 in the past so as to provide proper alignment with the two shafts which the unit is to interconnect. Since the conveyor 15 may be arranged through different angles, it readily will be appreciated that appreciable wear might occur on the universal joint. Furthermore it was found that certain shocks were transmitted as the grader moved down the road which tended to place undue stress upon the bearings of the transmission unit. In accordance with the present invention these effects were greatly minimized by the construction shown in detail in Figures 2 and 3.

Referring to Figures 2 and 3 it will be noted that the bracket 17 attached to the frame ahead of the cab 14 carries two U-shaped depending members 27 and 28 held in position by bolts and nuts 29 and 31. The transmission unit 18 has a housing which is provided with cylindrical bearing members 32 and 33. The one U-shaped member 27 carries a cooperating bearing member 34 for the housing portion 32. It is pivotally supported between the two U-shaped legs of the member 27 by suitable cap screws 35. In a similar manner the other bearing portion 33 of the housing is engaged by a bearing 36, which is pivotally supported by cap screws 37 passing through the two legs of the U-shaped support 28.

Mounted on the housing 18 is a stop member 38 which extends between the legs of the U-shaped support 28 thereby to limit the amount of rotation of the casing of the transmission unit 18 with respect to the supporting structure.

From the foregoing it will be noted that by supporting the U-shaped members 27 and 28 from the bracket 17 by single bolts 29 and 31, the alignment of the transmission unit 18 with respect to the axial line of the shaft 16 is facilitated. The pivotal support of the bearing members 34 and 36 further facilitates correct alignment of the transmission unit 18 with respect to the axial center of the shaft 16. The bearing supports 34 and 33 permit the housing unit to rotate through a certain angle thereby to accommodate the variations in the angle of the shaft 19 depending upon the degree of elevation of the upper end of the conveyor 15. Thus means have been provided for mounting a transmission gear unit interconnecting two shafts at right angles to each other, which will permit rotation of the housing of the transmission gear unit to a predetermined amount. This arrangement facilitates installation and minimizes wear.

Referring to Figures 4 and 5 there is shown the upper gear transmission unit 25, which connects the shafts 20 and 30, the latter shaft being connected to the drum which drives the conveyor belt. The shaft 20 is connected to the universal joint 24 of Figure 1. The shaft 30 is engaged by a bearing or pillow block 39 supported on the underside of the bracket 26 by a plurality of bolts 41. The bolts 41 pass through elongated openings 42 in the bracket 26. In Figure 5 it will be noted that the bolts 41 are at one extremity of the respective openings 42, which generally is the initial position prior to the time that the conveyor belt begins to stretch. Each of the bolts 41 above the bracket 26 is provided with a spacing sleeve 43, which is engaged by a plate 44 held in position by the nuts 45. From this it will be noted that the transmission unit 25 is primarily supported by the pillow block bearing 39 engaging the shaft 30. The housing of the transmission unit 25 is permitted a certain degree of angular rotation which is limited by a bracket 46 having two prongs 47 located between the bracket 26 and the plate 44. Thus an arrangement is provided which permits adjustment of the position of the shaft 30 to change the position of the belt driving drum connected thereto. In addition, the freedom of rotation of the housing 25 through a predetermined angle minimizes the wear on the bearings of the housing and facilitates proper alignment of the unit with respect to the two shafts interconnected thereby.

While for the purpose of illustrating and describing the present invention certain specific embodiments have been shown in the drawing, it is to be understood that such variations in the components employed and in their arrangement are contemplated as may be commensurate with the spirit and scope of the invention set forth in the accompanying claims.

It further is to be understood that while each of the transmission housings and mountings is of different construction and performs some different functions, that a common function is performed by both of them.

I claim as my invention:

1. The combination of two power transmitting shafts arranged at right angles to each other at all times, one of said shafts having its axis stationary, the other shaft having its axis movable through an angle in an axial plane normal to the axis of said first shaft, a bevel gear transmission unit interconnecting said shafts, said unit having a housing movable about the axis of one of said shafts, a support for said unit comprising a horizontal plate having an aperture adjacent each end, a depending U-shaped member secured to said plate at each end by a bolt passing through one of said apertures, said U-shaped member supporting a bearing for the stationary axis shaft, each bearing being pivotally supported between the sides of its U-shaped member transverse to the axis of the bearing.

2. The combination of two power transmitting shafts arranged at right angles to each other, one of said shafts having its axis stationary, the other shaft having its axis movable through an angle in its axial plane normal to the axis of said first shaft, a gear transmission unit interconnecting said shafts, said unit having a housing provided with bearing members on opposite sides thereof for one of said shafts, a support for said unit comprising a plate having an aperture adjacent each end, a pair of depending inverted U-shaped members each pivotally secured to said plate at one end thereof by a bolt passing through one of said apertures, means connecting the ends of each U-shaped member to one of said bearing members, and a stop secured to said housing and extending between the sides of one of said U-shaped members to limit the rotation of said housing and the angular movement of the other shaft.

3. The combination of a gear transmission unit interconnecting two power transmitting shafts arranged at right angles, said unit having a housing provided with two bearings at opposite sides for permitting said housing to pivot about the axis of one of said shafts, a support for said unit comprising a plate arranged parallel to said axis of said one shaft, said plate having apertures adjacent each end, a pair of inverted U-shaped members each secured by a bolt passing through one of said apertures and the center of the transverse portion of said U-shaped member, means connecting the ends of each U-shaped member to one of said two bearings, and a stop secured to said housing and extending between the sides of one of said U-shaped members to permit limited movement of said housing about said axis of said one shaft.

References Cited in the file of this patent
UNITED STATES PATENTS

| | | |
|---|---|---|
| 1,801,781 | Parsons | Apr. 21, 1931 |
| 2,050,497 | McCollum | Aug. 11, 1936 |
| 2,296,518 | Greer et al. | Sept. 22, 1942 |